United States Patent
Chang et al.

(10) Patent No.: US 11,809,789 B2
(45) Date of Patent: Nov. 7, 2023

(54) PARAMETRIC COMPONENT DESIGN PROCESS

(71) Applicant: United Technologies Corporation, Farmington, CT (US)

(72) Inventors: Hoyt Y. Chang, Manchester, CT (US); David A. Burdette, Glastonbury, CT (US); Joshua D. Winn, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 609 days.

(21) Appl. No.: 16/675,654

(22) Filed: Nov. 6, 2019

(65) Prior Publication Data

US 2021/0133295 A1 May 6, 2021

(51) Int. Cl.
*G06F 30/17* (2020.01)
*G06F 119/18* (2020.01)
*G06T 19/20* (2011.01)

(52) U.S. Cl.
CPC .............. *G06F 30/17* (2020.01); *G06T 19/20* (2013.01); *G06F 2119/18* (2020.01)

(58) Field of Classification Search
CPC ...... G06F 30/17; G06F 2119/18; G06F 30/23; G06T 19/20
USPC ........................................................ 703/7, 1
See application file for complete search history.

(56) References Cited

U.S. PATENT DOCUMENTS

| | | | | |
|---|---|---|---|---|
| 8,131,107 B2* | 3/2012 | Sun | ............................ | G06T 7/35 |
| | | | | 382/272 |
| 8,238,635 B2* | 8/2012 | Can | ........................... | G06T 7/001 |
| | | | | 382/141 |
| 9,704,293 B2* | 7/2017 | Date | ........................ | G06T 17/20 |
| 9,916,400 B1* | 3/2018 | Winn | ...................... | G06F 9/4488 |
| 10,203,290 B2* | 2/2019 | Ferro | ...................... | A61B 6/586 |
| 10,481,108 B2* | 11/2019 | Ferro | ...................... | A61B 6/586 |
| 10,861,147 B2* | 12/2020 | Wang | ........................ | B64F 5/60 |
| 10,902,664 B2* | 1/2021 | Xiong | .................... | F01D 21/003 |
| 10,928,362 B2* | 2/2021 | Finn | ........................ | G01N 29/11 |
| 11,079,285 B2* | 8/2021 | Finn | ........................... | G01J 5/60 |

(Continued)

FOREIGN PATENT DOCUMENTS

| | | |
|---|---|---|
| CN | 107577874 | 1/2018 |
| EP | 2950276 | 12/2015 |
| EP | 3196786 | 7/2017 |

OTHER PUBLICATIONS

European Search Report for Application No. 20204165.3 dated Mar. 16, 2021.

*Primary Examiner* — Juan C Ochoa
(74) *Attorney, Agent, or Firm* — Carlson, Gaskey & Olds, P.C.

(57) ABSTRACT

A method for implementing a component design model includes defining a component design specification, defining at least one variation mode parameter of a component manufacturing process, constructing a parametric model relating the at least one variation mode parameter to the component design specification, determining an expected component output based on the parametric model and comparing the expected component output to at least one as-manufactured component, and defining the parametric model as accurate in response to the expected output component matching the at least one as-manufactured component within a predefined degree of accuracy.

8 Claims, 4 Drawing Sheets

(56) References Cited

U.S. PATENT DOCUMENTS

| | | | |
|---|---|---|---|
| 11,475,179 B2* | 10/2022 | Machalica | G06F 30/17 |
| 2003/0149502 A1* | 8/2003 | Rebello | B33Y 80/00 |
| | | | 700/98 |
| 2004/0042656 A1* | 3/2004 | Timor | G06V 10/25 |
| | | | 375/E7.182 |
| 2016/0082502 A1* | 3/2016 | Appleby | C08L 63/00 |
| | | | 164/369 |
| 2018/0349518 A1* | 12/2018 | Byers | G05B 19/41875 |
| 2019/0104112 A1* | 4/2019 | Frazer | G07C 5/008 |
| 2019/0311081 A1 | 10/2019 | Heinle et al. | |
| 2020/0247056 A1* | 8/2020 | Binek | B22F 7/08 |

\* cited by examiner

TILT

SHIFT FWD-AFT

SHIFT UP-DOWN

PARAMETRIC COMPONENT DESIGN PROCESS

TECHNICAL FIELD

The present disclosure relates generally to airfoil component design for gas turbine engines, and to a process for identifying and minimizing manufacturing variations.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Components within the gas turbine engine, such as airfoils and the like, are constructed according to predefined design schematics. Due to manufacturing variability, components can occasionally be unacceptable for inclusion in a gas turbine engine, and the variations can take numerous forms including shifting, tilting, wall thickness variations, and the like. Due to the number of factors involved in the manufacturing process, and the number of possible variations, existing manufacturing process can result in unacceptably large numbers of components that need to be either reworked or scrapped.

SUMMARY OF THE INVENTION

In one example, a method for implementing a component design model includes defining a component design specification, defining at least one variation mode parameter of a component manufacturing process, constructing a parametric model relating the at least one variation mode parameter to the component design specification, determining an expected component output based on the parametric model and comparing the expected component output to at least one as-manufactured component, and defining the parametric model as accurate in response to the expected output component matching the at least one as-manufactured component within a predefined degree of accuracy.

In another example, the above method further includes modifying the parametric model relating the at least one variation mode parameter to the component design specification and reiterating determining the expected component output based on the parametric model and comparing the expected component output to the at least one as-manufactured component, in response to the expected output component deviating from the at least one as-manufactured component by more than the predefined degree of accuracy.

In another example of any of the above methods, the at least one as-manufactured component includes a plurality of components.

In another example of any of the above methods, the plurality of components includes at least 200 components.

In another example of any of the above methods, the plurality of components includes a range of 2 to 5 components.

In another example of any of the above methods, the at least one variation mode includes at least one of a shift, tilt, shrink, bend, and twist.

In another example of any of the above methods, the at least one variation mode includes each of shift, tilt, shrink, bend, or twist.

In another example, any of the above methods includes approving a component design by applying variations to the expected output component and verifying a functional acceptance of the expected output component.

In another example of any of the above methods, applying the variations to the expected output component includes generating a best fit shape of the expected component output and mesh morphing a nominal shape to the best fit shape.

In another example, any of the above methods includes performing a structural analysis of the mesh morphed best fit shape, thereby determining the functional acceptance of the expected output component.

In another example, any of the above methods includes correlating at least one variation mode with manufacturing parameters, defining an optimized shape using the at least one correlated parameter, and adjusting at least one manufacturing process parameter of a manufacturing process, thereby reducing an occurrence of the at least one variation mode in resultant components.

In one example, a computer aided design (CAx) system includes an expected component design module configured to determine an expected output component dimensions of a component design by defining at least one variation mode parameter of a component manufacturing process, constructing a parametric model relating the at least one variation mode parameter to the component design specification, determining an expected component output based on the parametric model and comparing the expected component output to at least one as-manufactured component, and defining the parametric model as accurate in response to the expected output component matching the at least one as-manufactured component within a predefined degree of accuracy.

In another example of the above CAx system, the expected component design module is a software module contained within a computer aided design environment.

In another example any of the above CAx systems a functional acceptance module configured to verify a functional acceptance of an expected output component by mesh morphing a nominal shape to the best fit shape.

In another example of any of the above CAx systems, verifying the functional acceptance includes performing a structural analysis of the mesh morphed best fit shape.

Another example of any of the above CAx includes performing a structural analysis of the un-morphed best fit shape, thereby determining the functional acceptance of the expected output component.

These and other features of the present invention can be best understood from the following specification and drawings, the following of which is a brief description.

DETAILED DESCRIPTION

Figure 1:
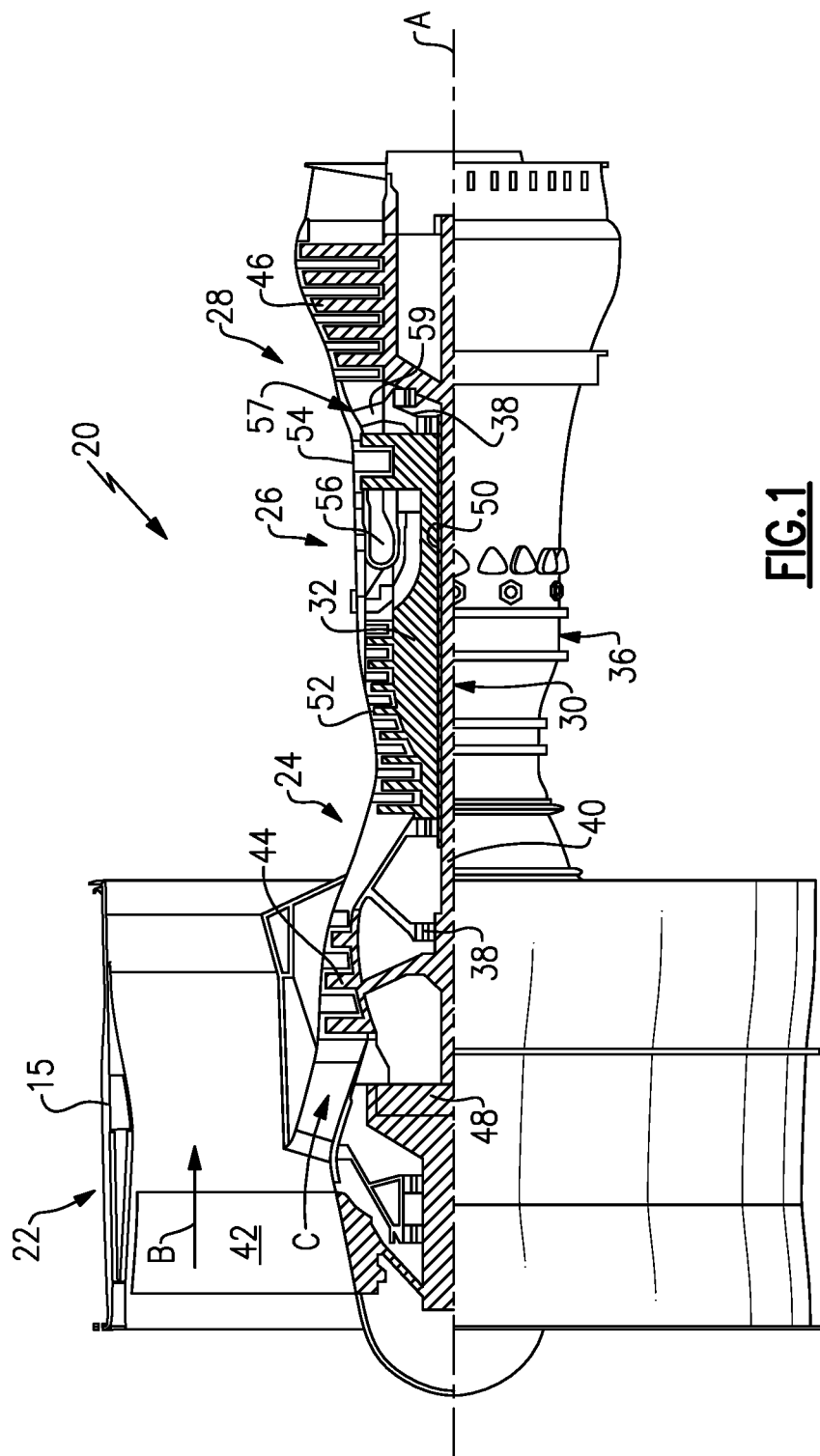
FIG. 1 illustrates an exemplary gas turbine engine according to one embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{-0.5}$. The "Low corrected fan tip speed" as disclosed herein according to one non-limiting embodiment is less than about 1150 ft/second (350.5 meters/second).

As is understood in the art, components output from a manufacturing process can include multiple variations resulting from different combinations of manufacturing parameters and tolerances. The different types of variations are referred to as manufacturing modes, and different combinations of manufacturing modes can result in components that are not functionally acceptable and/or are out of tolerance. As used herein, a functionally acceptable part is a part whose as-manufactured dimensions result in a functional part, even when one or more or the dimensions are out of a design tolerance. The functional acceptance of any given part is determined using an as-manufactured analysis that includes analyzing the part with the actual measured dimensions, and performing a structural analysis on the resultant component.

In many cases, the measured data is in the form of wall thickness at discrete points, such as with ultrasonic data, or CT scan based discrete wall measurements. In such instances a surface is interpolated between the points, in order to enable mesh morph software tools to morph to a surface. When the measured wall points are spaced far apart, traditional 2D and 3D interpolation methods do not provide an accurate fit due to undershoots, overshoots and other unrealistic shapes being generated.

Figure 2A:
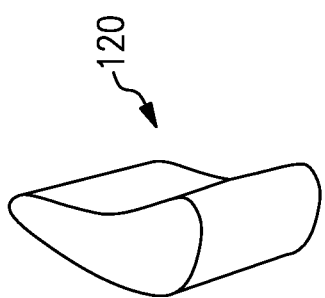
FIG. 2A schematically illustrates an exemplary aircraft component.
Figure 2D:
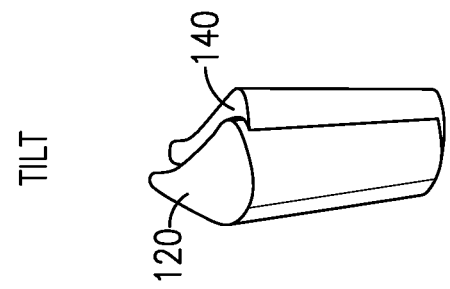
FIG. 2D schematically illustrates an exemplary aircraft component including a third possible manufacturing variation.
Figure 2C:
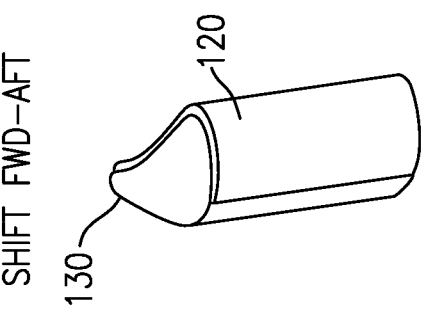
FIG. 2C schematically illustrates an exemplary aircraft component including a second possible manufacturing variation.
Figure 2B:
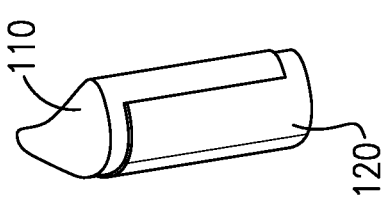
FIG. 2B schematically illustrates an exemplary aircraft component including a first possible manufacturing variation.

In one example, an investment casting process will often include particular variation types due to the ceramic core size and positioning. The variation types can include shift, tilt, shrink, bend, or twist, among other types of variations, which may be informed by computational simulation of the relevant manufacturing processes. FIGS. 2A-2D illustrate an example nominal component (FIG. 2A) and the result of multiple variation modes superimposed over the nominal component (FIGS. 2B-2D). The illustrated nominal component 120 is a single airfoil shaped vane, although the principles discussed herein can be applied to substantially more complicated components, such as the core shapes within airfoils produced with investment casting mentioned above. In FIG. 2B a radial shift variation mode is illustrated, with the actual component 110 being shifted radially from a nominal position 120 (with the radius being relative to the axis of rotation of the engine in which the component is to be included). Similarly, FIG. 2C illustrates an axially shifted component 130, relative to the nominal component 120. Lastly, FIG. 2D illustrates a tilt variation, where the manufactured component 140 is tilted around an axis parallel to the engine's axis of rotation, relative to the nominal component 120. The illustrated modes correspond to shifting of the investment casting core, and are referred to as translation modes. In alternative examples, other variation modes can include rotations, shrink/enlarge factors, bending factors and twisting factors.

While each of the examples (2B, 2C, 2D) illustrated in FIG. 2 shows a single variation mode, it is appreciated that any given as-manufactured component can include one or more of the modes simultaneously, resulting in distinct variations that may be unique to the combination of modes. Further, it can be difficult to identify which particular mode or combinations of modes led to a specific output variation, which makes it difficult to adjust the manufacturing parameters to compensate for, or minimize the output variations.

With continued reference to the example variation modes of FIGS. 2B-2D, FIG. 3 illustrates a process for generating a model capable of accurately accounting for potential variation modes and determining an expected component output based on a design specification. Initially, a designer defines multiple parameters that could cause one or more of the above described variation modes, such as shift, tilt, bend, shrink, etc. in a "Define Parameters" step 210. Once the variation mode parameters are defined, a parametric model is built in a "Build Parametric Model" step 220. The parametric model relates the expected resulting wall thickness or other measured parameter at each measured point of the part to each of the defined variation modes, and provides a defined affect that adjusting the variation mode has on the resulting wall thickness at each point. In alternative examples, where a parameter other than wall thickness is measured, a similar correlation is defined depending on the parameter being measured.

Once the parametric model has been constructed, the process 200 generates an expected output component based on the selected input variations in a "Predict Output Variations" step 230. This output is dependent on the selected input variations, and is determined by the parametric model. By way of example, the selected input variations can include a translation variation and a rotation. Specific variation values are applied to the parametric model, which predicts the resulting output(s).

Once the expected component dimensions have been determined, the expected component dimensions are compared to one or more sample components manufactured using the defined process parameters in a "Compare Output to Sample" step 240. In one example, the sample can be a single as-manufactured component manufactured using the defined parameters. In another example, the sample can be a set of two or more components manufactured using the defined parameters. In some practical examples, the output is automatically compared with approximately 200 samples. In other practical examples, the output is automatically compared with a small sample set of from 1 to 5 samples.

When the output expected component dimensions from the parametric model are within a certain degree of accuracy to the sample set, the process 200 determines that the model is accurate and outputs the parametric model in an "Output Accurate Model" step 250. In some examples, the model is confirmed accurate when every measured point of the sample set is within 1% of the expected value. In other examples, the model is confirmed to be accurate when every measured point of the sample set is within a predefined delta (e.g. 0.0002 inches/0.00508 mm) of the measured point. The threshold in either case is determined by an expected accuracy of the measurement system being used to determine the measurement point, or by the desired accuracy of a subsequent functional analysis.

When the set of as-manufactured components falls outside of the accuracy window, the parametric model is determined to be inaccurate, and the process returns to the build parametric model step 220, where the parametric model is tweaked based on the inaccuracy. The adjustments to the model are automatically determined in some examples using optimization approaches. In alternative examples, the adjustments to the model can be made manually after an operator is notified that the output of the model is outside of the predetermined parameters. By way of example, an operator may add an additional mode of variation to the parametric model. The iterative nature of this process allows the parametric model to be continuously refined to account for new information, and to allow for continuous improvement to the parametric model.

Once an accurate parametric model has been generated, the accurate model can be used to produce the variations of an output component, based on the input parameters of the component. These variations can be used within existing optimization algorithms, such as least squares best fit algorithms, or within custom optimization algorithms which can optimize the part design and/or the manufacturing process of the part.

With continued reference to FIGS. 1-3, FIG. 4 schematically illustrates a process for utilizing the parametric model to represent, simulate, and approve/disapprove a manufactured part. Initially the model output from process 200 is fit to the measurements of a new manufactured part in a "Generate Best Fit Shape of New Component" step 310. The generated best fit shape reflects the measured dimensional data and manufacturing variations, and is not directly dependent on the original design intent and/or the original specifications.

Once the best fit shape has been determined, the best fit shape is set as a target shape for mesh morphing operations. A mesh of the nominal shape is morphed to the best fit shape in a "Mesh Morph Nominal Shape to Best Fit Shape" step 320. Using the best fit shape and mesh morphing, a representative model for the entire part is generated based on the inspected measurements and pre-determined variations defined in the parametric model.

After the best fit shape mesh has been generated, a structural analysis is performed using any conventional structural analysis system in a "Perform Structural Analysis of Expected Shape" step 330. Based on the results of the structural analysis, the design can be either approved or disapproved in an "Approve/Disapprove Design" step 340 according to any appropriate criteria for the given component.

The process described above and illustrated in FIG. 4 facilitates validation of manufactured parts.

Figure 3:
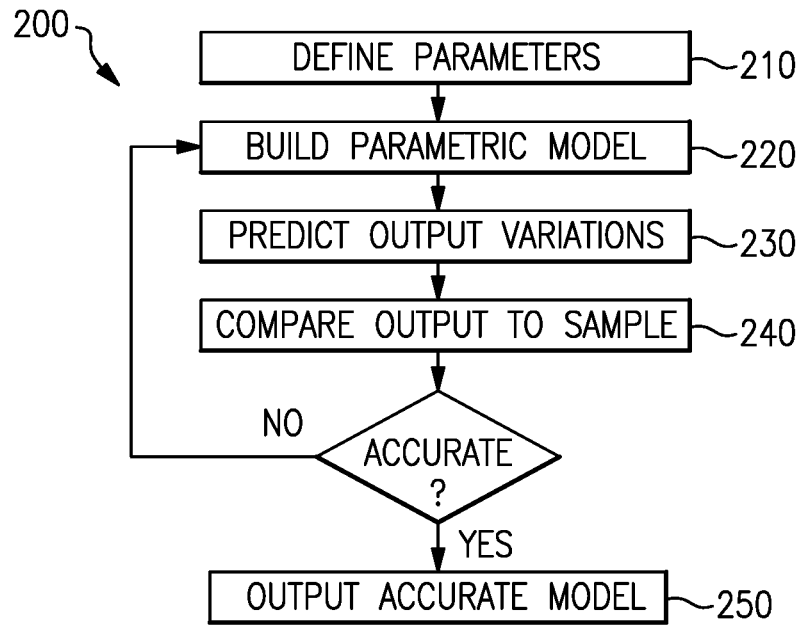
FIG. 3 illustrates an exemplary process for generating a manufacturing model.

With continued reference to FIGS. 1-4, FIG. 5 schematically illustrates a process for using the accurate model determined in the process of FIG. 3 to minimize an occurrence of variations within a manufacturing process. Initially the model generated in the process of FIG. 3 is used to visualize and identify combined manufacturing variation modes in a "Correlate Variations with Manufacturing Parameters" step 410. Processes that only plot discrete inspection points (e.g. the mesh points with no interpolation) are incapable of visualizing the resultant shape produced by manufacturing variation modes. This difficulty is exacerbated in multi-walled airfoils, and other more complex components, where the results of multiple manufacturing variances are not easy to envision.

The correlations are determined by inputting the variations into the model, and reviewing the resultant output expected dimensions to determine how each variation affects the resultant geometry of the component. Alternatively, depending on what parametric variations have been included in the parametric model, some parametric variations may be directly associated with manufacturing processes based on domain knowledge and experience. Once the variations have been correlated with manufacturing parameters using the model determined above, the process breaks down the optimized shape into individual manufacturing mode components in a "Define Optimized Shape Using Correlated Parameters" step 420. Once the optimized shape definition has been defined for a number of manufactured parts, the manufacturing process is adjusted to target specific steps in the manufacturing process to reduce common, undesirable variation modes in an "Adjust Manufacturing Process" step 430.

Figure 4:
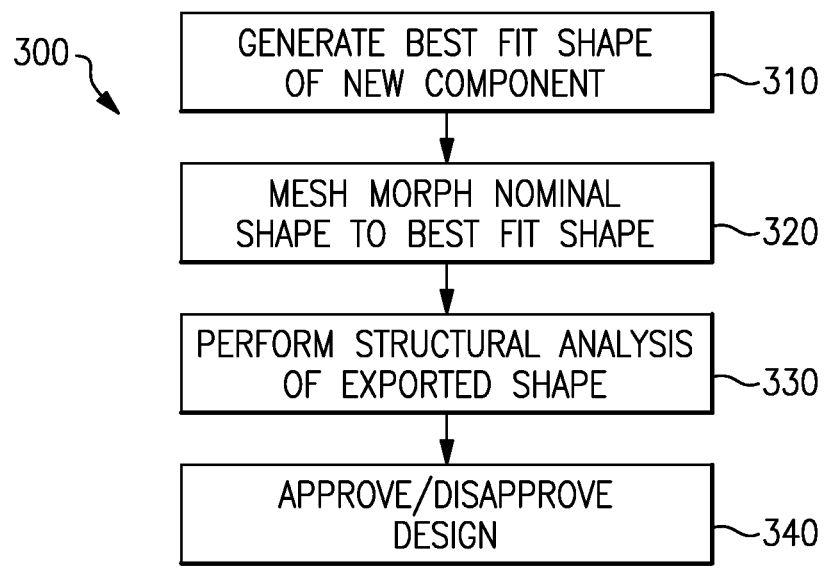
FIG. 4 illustrates a process for utilizing the manufacturing model to determine an expected part output of a given manufacturing process.
Figure 5:
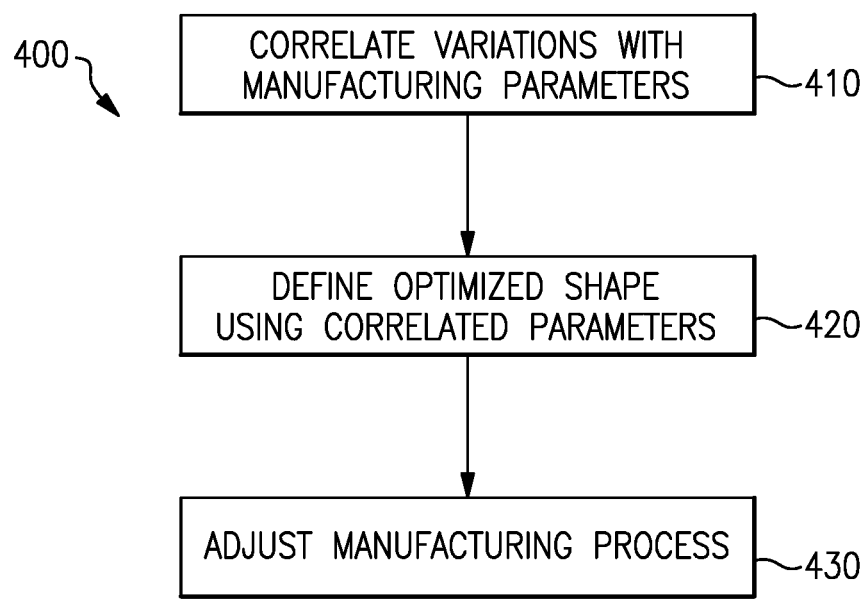
FIG. 5 illustrates a process for utilizing the manufacturing model to minimize a quantity of unacceptable components output by a manufacturing process.

While the processes illustrated in FIGS. 4 and 5 utilizes the accurate model determined in the process of FIG. 3, it is appreciated that the accurate model can be utilized in any additional capacity, and is not limited in use to the described applications.

While described above as independent processes, it is appreciated that the processes can be implemented as software modules within a computer aided design (CAx) system, and/or any other computer based product design and management system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for generating a component design model comprising:
    defining a component design specification;
    defining at least one variation mode parameter of a component manufacturing process, wherein the at least one variation mode parameter includes each of shift, tilt, shrink, bend, and twist;
    constructing a parametric model relating the at least one variation mode parameter to the component design specification;
    determining an expected output component based on the parametric model and comparing the expected output component to at least one as-manufactured component; and
    defining the parametric model as accurate in response to the expected output component matching the at least one as-manufactured component within a predefined degree of accuracy.

2. The method of claim 1, further comprising modifying the parametric model relating the at least one variation mode parameter to the component design specification and reiterating determining the expected output component of the component manufacturing process based on the parametric model and comparing the expected output component of the component manufacturing process to the at least one as-manufactured component, in response to the expected output component of the component manufacturing process deviating from the at least one as-manufactured component by more than the predefined degree of accuracy.

3. The method of claim 1, wherein the at least one as-manufactured component comprises a plurality of components.

4. The method of claim 3, wherein the plurality of components comprises at least 200 components.

5. The method of claim 3, wherein the plurality of components comprises a range of 2 to 5 components.

6. The method of claim 1, further comprising approving a component design by applying variations to the expected output component and verifying a functional acceptance of the expected output component.

7. The method of claim 6, wherein applying the variations to the expected output component comprises generating a best fit shape of the expected output component and mesh morphing a nominal shape to the best fit shape.

8. The method of claim 7, further comprising performing a structural analysis of the mesh morphed best fit shape, thereby determining the functional acceptance of the expected output component.

* * * * *